(12) United States Patent
Burke, Jr. et al.

(10) Patent No.: US 8,614,821 B2
(45) Date of Patent: Dec. 24, 2013

(54) SYSTEMS AND METHODS FOR MANAGING CUSTOMER REPLACEABLE UNIT MONITOR (CRUM) PAIRED IDENTIFIERS USING A CLOUD ADMINISTRATION SYSTEM

(75) Inventors: Robert William Burke, Jr., Stanley, NY (US); Karen Dobremsyl, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 138 days.

(21) Appl. No.: 13/357,368

(22) Filed: Jan. 24, 2012

(65) Prior Publication Data

US 2013/0188213 A1 Jul. 25, 2013

(51) Int. Cl.
 *G06F 3/12* (2006.01)
 *G06K 15/00* (2006.01)
 *H04N 1/40* (2006.01)
 *G03G 15/00* (2006.01)

(52) U.S. Cl.
 USPC ....... 358/1.15; 358/1.16; 358/3.23; 358/3.29; 399/8; 399/11; 399/12; 399/18; 399/25

(58) Field of Classification Search
 USPC ................ 348/1.14, 1.15, 296, 1.16, 1.9, 1.1, 348/3.23, 501, 502, 504, 508, 498, 302, 348/305, 1.8, 3.02, 3.06, 3.09, 3.1, 3.11, 348/3.12, 3.32; 399/1, 8, 10, 11, 12, 13, 18, 399/21, 24, 25, 26, 27, 31, 37, 38, 33, 29, 399/30, 77, 75, 80, 83, 88, 91, 96, 99, 101, 399/107, 108, 109, 111, 113, 112, 255, 399/262; 705/27.52, 63, 67, 72, 7.12, 7.22, 705/7.23, 7.24, 7.25, 7.27, 7.29, 7.31, 7.34, 705/7.38, 7.15, 14.24, 14.25, 14.52, 14.55, 705/14.56, 14.57, 14.58, 14.61, 14.64, 75, 705/318; 715/200, 221, 222, 224, 225, 227, 715/700, 716, 736, 763, 748, 747, 745, 743, 715/734, 744, 750, 765, 811, 961, 963, 965
 See application file for complete search history.

(56) References Cited

U.S. PATENT DOCUMENTS

| | | | |
|---|---|---|---|
| 6,016,409 A | 1/2000 | Beard et al. | |
| 8,505,004 B2 * | 8/2013 | Burke, Jr. | 717/173 |
| 2006/0133828 A1 * | 6/2006 | Rommelmann et al. | 399/8 |
| 2006/0133831 A1 * | 6/2006 | Rommelmann et al. | 399/12 |
| 2007/0047974 A1 * | 3/2007 | Tanaka | 399/8 |
| 2012/0016778 A1 * | 1/2012 | Salle et al. | 705/27.1 |

\* cited by examiner

*Primary Examiner* — Ngon Nguyen
(74) *Attorney, Agent, or Firm* — Ronald E. Prass, Jr.; Prass LLP (57) ABSTRACT

A data centric, cloud architecture for managing image forming device information through interactive communication with customer replaceable unit monitors (CRUMs) associated with customer replaceable units (CRUs) installed in image forming devices is provided. CRUM identifiers and a cloud data objects containing the same unique identifiers are used to aid a supplier or manufacturer in keying individual CRUs to particular installations in printers and/or other image forming devices. This association strengthens the ability to logistically control the CRUs. A cloud administration system is used to track an identifier for a CRU installed in a particular image forming device such as, for example, a printer, to determine whether the CRU identifier matches an associated cloud object identifier for that printer.

20 Claims, 5 Drawing Sheets

FIG. 4B though the GUI must be monitored. Because con-
SYSTEMS AND METHODS FOR MANAGING CUSTOMER REPLACEABLE UNIT MONITOR (CRUM) PAIRED IDENTIFIERS USING A CLOUD ADMINISTRATION SYSTEM This application is related to U.S. patent application Ser. No. 13/112,245, entitled "Method and System for Managing Print Jobs Using a Cloud Administration System;" Ser. No. 13/112,303, entitled "Method and System for Managing Print Device Information Using a Cloud Administration System;" Ser. No. 13/112,396, entitled "Methods and Systems for Providing Software Updates Using a Cloud Administration System;" Ser. No. 13/112,455, entitled "Methods and Systems for Tracking and Managing Print Device Inventory Information Using a Cloud Administration System;" and Ser. No. 13/112,552, entitled "Method and System for Managing Print Device Information Using a Cloud Administration System;" each of which is commonly assigned and was filed on May 20, 2011. The disclosures of these related applications are hereby incorporated by references herein in their entirety.

BACKGROUND

1. Field of the Disclosed Embodiments

This disclosure relates to systems and methods for employing cloud administration services and systems to interact with electronically-readable component monitoring modules associated with customer replaceable components in customer owned and/or controlled devices, such as, for example, image forming devices.

2. Related Art

Industries make extensive beneficial use of a capability to externally monitor the status of myriad customer replaceable components in all manner devices and systems with which the customer replaceable components are associated. The monitoring of these customer replaceable components is often facilitated through the use of an externally or remotely electronically-readable monitoring module for monitoring one or more characteristics of the customer replaceable component. The monitored characteristics can include static information, i.e., information that does not change over the life of the component, such as a model or serial number and/or compatibility of the customer replaceable component with the system or device within which the customer replaceable component is installed. The monitoring module can also be used to record, in an electronically-readable format, dynamically changing information relating to a particular characteristic of the customer replaceable component. Such dynamic information includes, for example, information on use, maintenance, failures, diagnostics, remanufacture, and remaining service life, among other characteristics of the customer replaceable component.

Outputs from these monitoring modules are received locally at the system or device via some manner of graphical user interface (GUI) associated with the system or device within which the customer replaceable component is installed. In order to appropriately exploit this information locally, however, the GUI must be monitored. Because constant monitoring of the GUI is often impractical, systems or devices that provided only local monitoring often experienced unanticipated shutdowns due to unrecognized or uncorrected pending or actual conditions of one or more replaceable components when locally displayed alerts went unheeded by available personnel. Such shutdowns were inconvenient and often caused customers or other end-users to incur substantial expense in (1) lost revenue due to unanticipated down time for the system or device, and (2) requirements for expedited servicing, and/or immediately fillable orders for replacement components.

In order to address this shortfall, many industries transitioned from local monitoring ad hoc of customer replaceable components via the electronically-readable monitoring modules to external and remote, particularly supplier-based or manufacturer-based, monitoring of customer replaceable components at end-use sites. This change allowed suppliers and manufacturers to independently monitor the status of customer and/or field replaceable components in order to avoid, for example, non-availability of required replacement components at a point and time of need.

Examples of externally monitorable systems or devices include various types of electronic office equipment, particularly image forming devices, such as those disclosed in, for example, U.S. Pat. No. 6,351,621 to Richards et al., which is commonly assigned and the disclosure of which is incorporated herein by reference in its entirety. Richards discloses customer replaceable components, called customer replaceable units ("CRUs"), which routinely include electronically-readable monitoring chips containing static information for identification of the CRU, and/or dynamic information relating to a particular CRU's operating status. Richards refers to such electronically-readable monitoring chips as customer replaceable unit monitors ("CRUMs").

Richards explains that, when an individual CRU is installed in the disclosed modularly designed office equipment, a communication interface is established with the CRUM as a component status monitoring module located within, or externally mounted to, a particular CRU. The CRUM enables the office equipment to monitor a characteristic of the CRU by reading data from, and potentially updating the information contained by writing data to, the monitoring module.

In printers and/or other image forming devices, systems for communicating with and/or remotely diagnosing the status of widely-dispersed devices are as well-known as they are in other technology areas. These devices communicate via any manner of wired or wireless communications with network interfaces such as, for example, via telephone lines, local area networks, and/or the Internet, in order to provide, for example, a remote service center with access to the device in order to read status and/or diagnostic information produced by the device. Remote and widely dispersed access is thus implemented such that an operator, supplier, manufacturer, diagnostic technician or other individual whose duties may require access to information regarding the status of the device, or any replaceable component operating within the device, can review the information.

As communication capabilities have continued to evolve, so too have the capabilities to not only read information from, but also to write information to, CRUMs. In this manner, the ability to communicate information to, and receive information from, CRUMs provides a capacity for management of CRUs and consumables in an image forming device by allowing the association of data with the CRUMs.

Today, the term "cloud computing," for example, for the provision of computing services through a cloud administration system, is generally considered to refer to delivering computing capacity as a service via a combined wired/wireless network in which shared resources, software and information are provided to computers and other devices over the network (typically the Internet). Cloud computing provides a new model for the delivery of IT services based on Internet protocols, through network systems that include "virtualized" resources. The cloud provides an interactive resource in which information and applications may be stored and accessed.

SUMMARY OF THE DISCLOSED EMBODIMENTS

It would be advantageous to employ the capabilities provided by a cloud administration system to interact with electronically-readable monitoring modules, such as CRUMs associated with CRUs in any manner of image forming devices to exploit the capabilities provided to a number of beneficial purposes.

Exemplary embodiments of the disclosed systems and methods may provide a data centric, cloud architecture for managing image forming device information through interactive communication with CRUMs associated with CRUs installed in many and widely deployed image forming devices.

Exemplary embodiments may associate a CRUM identifier and a cloud data object containing the same identifier to aid a supplier or manufacturer in keying individual CRUs to particular installations in printers and/or other image forming devices. This association may strengthen the ability to logistically control the CRUs.

Exemplary embodiments may employ the cloud administration system to track, for example, an identifier for a CRU installed in a particular image forming device such as, for example, a printer, to determine whether the CRU identifier matches an associated cloud object identifier for that printer. When a mismatch is determined, the cloud administration system may cause the printer to post a message to the GUI associated with the printer that the currently-installed CRU is not a correct CRU for the printer, and/or may otherwise communicate this condition to the supplier, manufacturer or user for monitoring or replacement.

Exemplary embodiments may facilitate CRUs being correctly returned to the supplier or manufacturer at a particular location that the supplier or manufacturer designates by causing a prepaid shipping label to be associated with each expended CRU that is to be returned, and further by causing that prepaid shipping label to be printed for the CRU.

Exemplary embodiments may provide an ability to expand the CRUM's association of specific data with a CRU for management of the CRU such that the specific data of the CRUM may be associated with cloud data to prevent, for example, unauthorized rebuilding or reuse of CRUs.

Exemplary embodiments may provide a capability whereby, when certain image forming devices are shipped to an end-user from a warehouse in a "consumable neutral" state, configurations for use of separately-sold, or otherwise metered, consumables such as toner cartridges may be confirmed or rendered compatible with the image forming device. In circumstances where device and CRU configurations require compatibility matching between, for example, a toner cartridge and the image forming device, the cloud administration system via the CRUM may confirm or reset configuration matching data after the insertion of the first toner cartridge in the image forming device for use.

Exemplary embodiments may provide a capability to correct a configuration of an image forming device that is, for example, erroneously configured as sold. Instead of dispatching a technician to go on-site to convert the image forming device to the "correct" configuration, correction of the configuration and/or compatibility with a particular CRU may be modified via communication of the cloud administrator system with the CRUM. This capability advantageously benefits the supplier or the manufacturer in (1) obviating a requirement to dispatch a technician to an end-user site at all, and (2) circumventing a circumstance where, for example, a particular end-user may attempt to bar access of a dispatched technician to the installed image forming device.

Exemplary embodiments may facilitate monitoring of use of the image forming device, maintaining compatibility with myriad CRUs (even as a Device/CRU compatibility matrix may be modified), enforcing contractual limitations on use of a particular image forming device and/or undertaking other activities associated with use, maintenance and fault diagnosis in an image forming device via interactive communication according to paired identifiers in the CRUM and the cloud administration system. A mechanism is provided whereby CRU metadata could be remotely modified through cloud data maintained in a cloud administration system to any of the beneficial purposes discussed above, or otherwise.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for employing cloud administration services and systems to interact with an externally-readable component monitoring module associated with a customer replaceable component in a customer owned and/or controlled device, such as, for example, an image forming device, will be described, in detail, with reference to the following drawings, in which.

DETAILED DESCRIPTION OF THE DISCLOSED EMBODIMENTS

The systems and methods for employing cloud administration services to interact with a an externally electronically-readable component monitoring module such as, for example, a CRUM associated with, and employed for monitoring of, a CRU in an image forming device according to this disclosure will generally refer to this specific utility for those systems and methods. Exemplary embodiments described and depicted in this disclosure should not be interpreted as being specifically limited to any particular configuration, or directed to any particular intended use. In fact, any monitoring and/or control of an electronically-readable component monitoring module via a support module provided in a cloud administration system that may benefit from the systems and methods according to this disclosure is contemplated.

Specific reference to, for example, any particular image forming device, including but not limited to any of a printer, copier, scanner, facsimile machine or multi-function device, should be understood as being exemplary only, and not limited, in any manner, to any particular class of devices. The systems and methods according to this disclosure will be described as being particularly adaptable to use in printing and/or copying devices such as, for example, xerographic image forming devices for printing and/or copying, but should not be considered as being limited to only these types of devices. Any commonly known image forming device capable of wirelessly communicating with a remote computing/monitoring device via a cloud administration system that may be adapted according to the specific capabilities discussed in this disclosure is contemplated.

The disclosed embodiments may be advantageously operated in a networked computing environment. A cloud administration system may be provided in communication with a plurality of image forming devices for communication with CRUMs associated with CRUs in those image forming devices to a number of beneficial purposes, which may include compatibility management and contract enforcement among others. A remote monitoring system may be centrally located at some extended distance from each of the plurality of image forming devices. The cloud administration system may include a number of data storage modules, including a CRUM info storage module, in communication with (1) the remote monitoring system, and (2) the plurality of image forming devices. The remote monitoring system may be configured to execute a number of monitoring functions and separately a number of control functions with regard to the plurality of image forming devices. Information regarding an identifier for a CRUM associated with a particular CRU, a configuration of the particular CRU, status of the particular CRU (to include that a CRU may be defective in some way), compatibility of the particular CRU with an individual image forming device within which the particular CRU is installed, and instructions for return of the particular CRU, when expended, to a supplier or manufacturer, may be stored in the CRUM info storage module according to a paired identifier for each CRUM with which the cloud administration system communicates. This information may be shared with the identifier-paired CRUM as required for monitoring and control of the particular CRU and the individual image forming device within which the particular CRU is installed. This information may include one or more instructions for rendering the individual image forming device inoperable if the individual image forming device operates, or attempts to operate, the CRU in an improper or unauthorized manner. Conversely, the information may provide a mechanism by which to render the individual image forming device operable by, for example, remotely updating configuration or compatibility information for the CRU stored in the CRUM info storage module of the cloud administration system. The cloud administration system may operate as a shared resource for each of the plurality of image forming devices to execute functions such as those described above.

Figure 1:
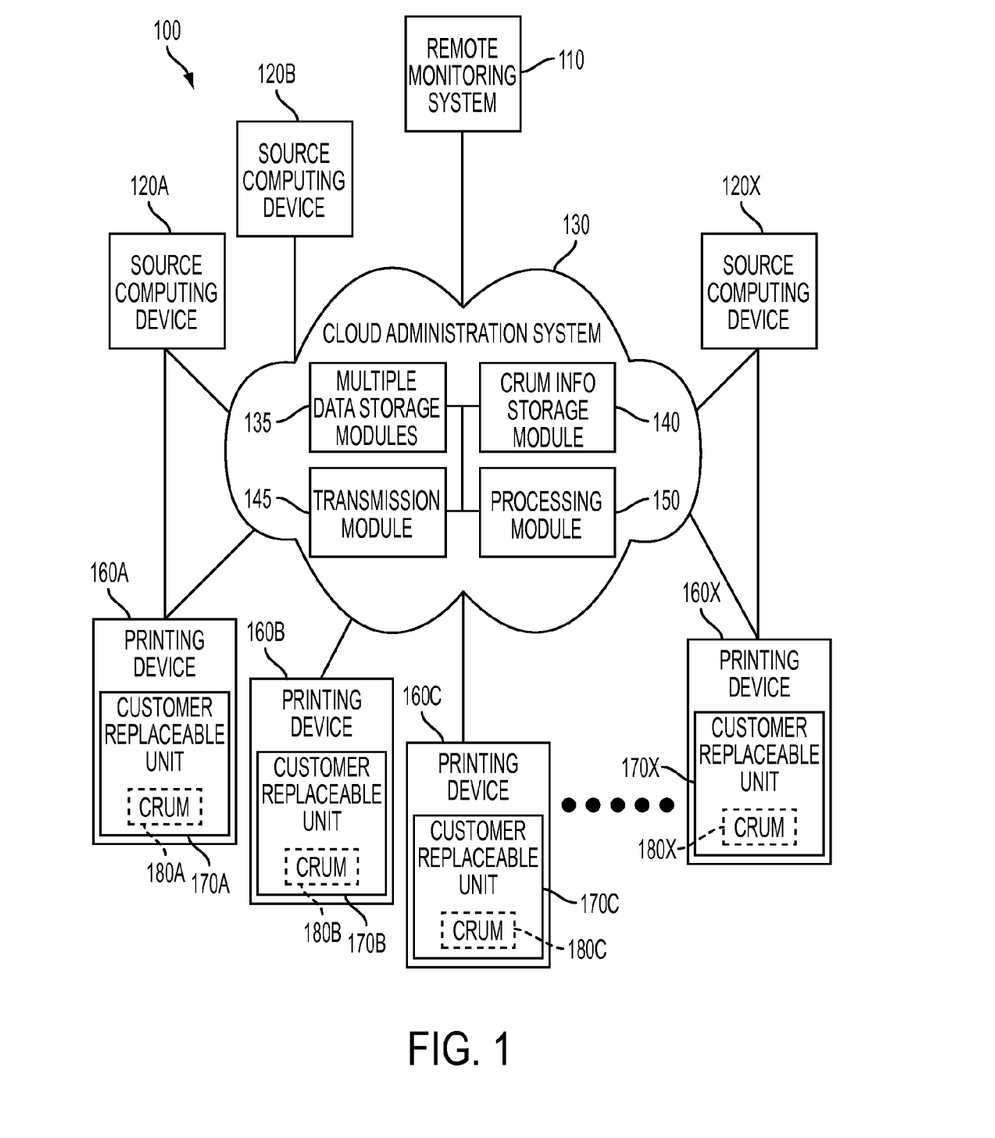
FIG. 1 illustrates a schematic diagram of an exemplary overview of networked environment including a cloud administration system within which the systems and methods according to this disclosure may operate.

FIG. 1 illustrates a schematic diagram of an exemplary overview of networked environment 100 including a cloud administration system 130 within which the systems and methods according to this disclosure may operate. As shown in FIG. 1, the exemplary local networked environment 100 may include: at least one remote monitoring system 110; a plurality of source computing devices 120A-X; the cloud administration system 130 incorporating multiple data storage modules 135 (not further discussed in any detail and therefore shown as a single element in FIG. 1), a CRUM info storage module 140, a transmission module 145 and a processing module 150; and a plurality of printing devices 160A-X. Note that the terms "printing device" and "image forming device" will be used interchangeably throughout the rest of this disclosure.

At least one remote monitoring system 110 may be advantageously located at, for example, an appropriate site for a supplier or manufacturer to use to monitor, and exercise some control over, operations of the plurality of printing devices 160A-X. This monitoring and control may advantageously assist end-users of the printing devices 160A-X by allowing the supplier or manufacturer to monitor and correct configuration control between the printing devices 160A-X and a number of replaceable components to be installed in the printing devices 160A-X. The supplier or manufacturer, for example, may detect issues of non-compatibility between the customer replaceable components and the printing devices 160A-X and, where appropriate, update the compatibility or configuration information stored in the cloud administration system 130. Separately, the supplier or manufacturer may detect a nearly-expended condition, or an "end of service life" condition, for one or more customer replaceable components and dispatch replacement components to the end-user in time to be installed in the printing devices 160A-X to avoid any loss of productivity from the printing devices 160A-X due to expenditure of a consumable. The monitoring and control may advantageously assist the supplier or manufacturer with contract enforcement in situations where the remote monitoring system 110 may detect unauthorized, i.e., non-contractual, use of one or more of the printing devices 160A-X by monitoring information available regarding installed customer replaceable components and, for example, a rate at which consumables are being expended.

The plurality of source computing devices 120A-X may communicate with the plurality of printing devices 160A-X for directing or enabling operation of the plurality of printing devices 160A-X. This communication may be via wired or wireless means either directly or via one of the multiple data storage modules 135 and a transmission module 145 in the cloud administration system 130. The plurality of source computing devices 120A-X may send print jobs to one or more of the plurality of printing devices 160A-X. The plurality of source computing devices 120A-X may also receive feedback from one or more of the plurality of printing devices 160A-X regarding conditions of the one or more of the plurality of printing devices 160A-X that, for example, may affect the ability of an individual printing device to execute a commanded print job. This feedback may include information updated in the one or more of the plurality of printing devices 160A-X based on information stored in the cloud administration system 130 by remote monitoring system 110, particularly when changes in an operating status or operating conditions of a particular printing device are directed by the remote monitoring system 110.

The cloud administration system 130 is at the heart of the capability of the disclosed networked system 100. The cloud administration system 130 may comprise one or more physical and/or logical devices that operate as a shared resource for the plurality of printing devices 160A-X and/or the computing devices represented in FIG. 1 as the remote monitoring system 110 and the source computing devices 120A-X. In the context of this disclosure, the term "logical device" is intended to refer generally to a representation of a physical device that uniquely identifies the corresponding physical device. For example, an electronically-readable monitoring module associated with the customer replaceable component in one or more of the printing devices 160A-X may be assigned a unique identifier that is the logical unique identifier of that particular physical module. The individual electronically-readable monitoring module, as identified by the cloud administration system 130, therefore, is a combined logical and physical device in which the logical device provides the entire identity of the physical device. Logical devices in a cloud administration system 130 may be accessed simply by reference to the unique identifier without any knowledge of the corresponding physical devices. The cloud administration system 130 may include multiple data storage modules 135. An advantage of the cloud administration system 130 is that these multiple data storage modules 135 may be "virtualized" and available to individual purposes for communication between, for example, a remote monitoring device 110 and the one or more source computing devices 120A-X, and the plurality of printing devices 160A-X. Specific interplay between these separate multiple data storage modules 135, and one or more related queues associated with each of the multiple data storage modules 135 are discussed in detail in the above-identified related applications and will not be repeated here.

The cloud administration system 130 may advantageously employ a transmission module 145 by which the cloud administration system 130 receives and transmits data to and from respective nodes in the networked system 100. This transmission module 145 may be in wired or wireless communication with any of the exemplary elements comprising the networked system 100 shown in FIG. 1. Lines of communication between the transmission module 145 and the other components of the networked system may be via one or more firewalls depending on a level of protection deemed appropriate for such communication.

The cloud administration system 130 may advantageously employ a processing module 150 within which the cloud administration system 130 may conduct local processing of received and/or stored data. Such processing may include coordinating inputs received from at least one remote monitoring system 110 and/or the plurality of printing devices 160A-X and determining which information should be stored in the CRUM info storage module 140.

Each of the plurality of printing devices 160A-X may have associated with it one or more CRUs 170A-X. Although depicted in FIG. 1 as a single CRU 170A-X associated with each of the printing devices 160A-X for simplicity in depiction and ease of understanding, it should be recognized that an individual printing device 160A-X may have associated with it any number of CRUs 170A-X. Further, many of the CRUs 170A-X will have associated with them CRUMs 180A-X. It is these CRUMs 180A-X that provide ultimately a mechanism by which the cloud administration system 130 is able to interact with individual components of the printing devices 160A-X.

CRUMs 180A-X are provided to aid in identifying an individual CRU 170A-X to the individual printing device 160A-X within which the individual CRU 170A-X is installed. Configuration control and compatibility matching between a printing device 160A-X and a CRU 170A-X can be facilitated based on information written in the CRUM 180A-X. The printing device 160A-X may include a communication module that provides power to, and communicates directly with, the CRUM 180A-X. Once communication is established between the printing devices 160A-X and the CRUMs 180A-X, updatable information regarding conditions of the printing devices 160A-X and the installed CRUs 170A-X may be exchanged with, and stored in, the CRUMs 180A-X.

Figure 2:
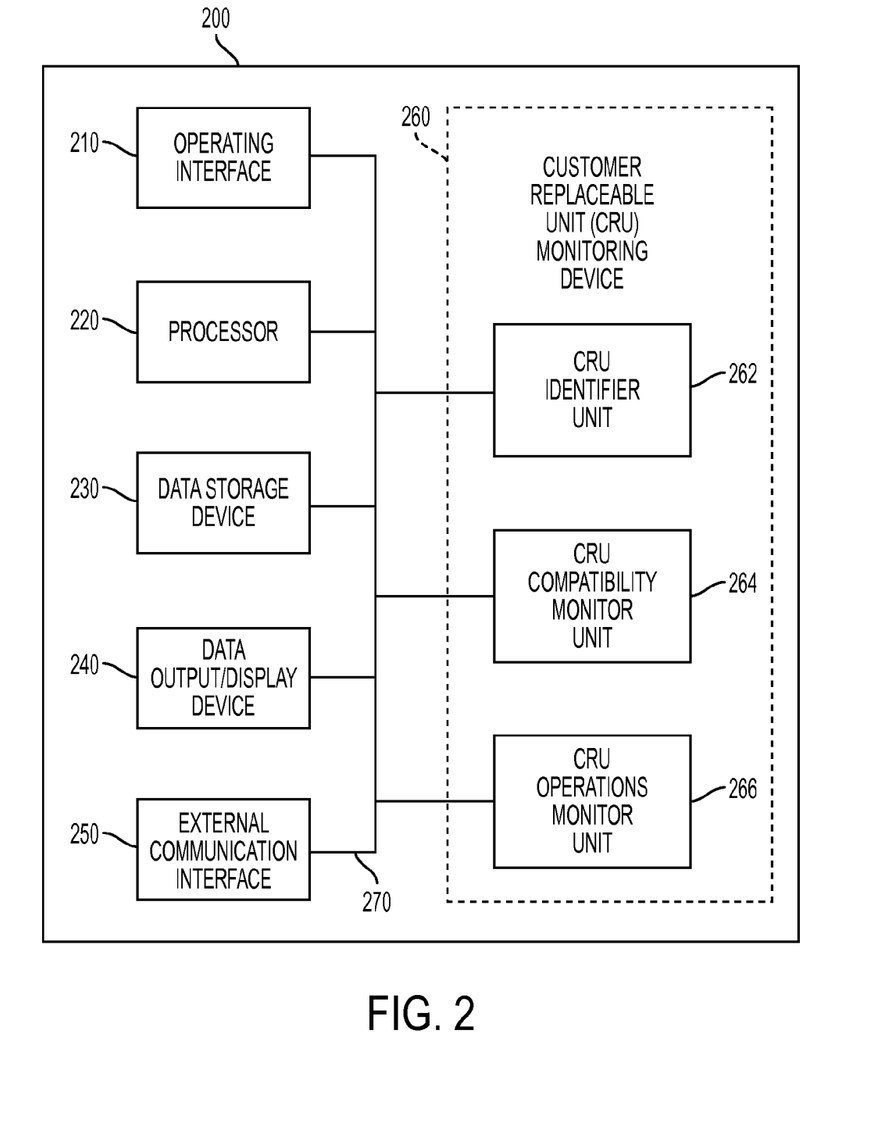
FIG. 2 illustrates a block diagram of an exemplary remote monitoring system that communicates with the cloud administration system to execute monitoring and control functions over a plurality of image forming devices according to this disclosure.

FIG. 2 illustrates a block diagram of an exemplary remote monitoring system 200 that communicates with the cloud administration system to execute monitoring and control functions over a plurality of image forming devices according to this disclosure. The exemplary remote monitoring system 200 shown in FIG. 2 may be, for example, housed in a remote location that may be overseen by a supplier or manufacturer of printing devices or licensed components for such printing devices.

The exemplary remote monitoring system 200 may include an operating interface 210 by which a user may communicate with the exemplary remote monitoring system 200, or otherwise by which the exemplary remote monitoring system 200 may receive instructions input to it from another source.

In instances where the operating interface 210 may be a locally accessible user interface, the operating interface 210 may be configured as one or more conventional mechanisms common to computing devices that permit a user to input information to exemplary remote monitoring system 200. The operating interface 210 may include, for example, a conventional keyboard and mouse, a touchscreen with "soft" buttons or with various components for use with a compatible stylus, a microphone by which a user may provide oral commands to the exemplary remote monitoring system 200 to be "translated" by a voice recognition program, or other like device by which a user may communicate specific operating instructions to the exemplary remote monitoring system 200.

When the operating interface 210 is otherwise configured as, for example, data reception port, the operating interface 210 may appropriately communicate via wired or wireless connections with, for example, an overarching system that maintains inventory control, contract specifications, operating parameters, consumables compatibility matrices, and other like information regarding manufactured, sold, or otherwise supplied printing devices. This information may be downloaded to, or otherwise accessed by, the exemplary remote monitoring system 200 in carrying out its remote monitoring function.

The exemplary remote monitoring system 200 may include one or more local processors 220 for individually operating the exemplary remote monitoring system 200 and for carrying out data collection, processing, assessment and control functions. Processor(s) 220 may include at least one conventional processor or microprocessor that interprets and executes instructions to direct specific data collection, monitoring and storage functions with regard to a specific printing device, or a plurality of printing devices via a cloud administration system such as that shown in FIG. 1. Processor(s) 220 may initiate and control of the data collection and analysis efforts of the exemplary remote monitoring system 200, or may otherwise direct an update, for example, to the information stored in a CRUM info storage module in the cloud administration system.

The exemplary remote monitoring system 200 may include one or more data storage devices 230. Such data storage device(s) 230 may be used to store data or operating programs to be used by the exemplary remote monitoring system 200, and specifically the processor(s) 220. Data storage device(s) 230 may be used to collect information regarding any or all of the functions of the exemplary remote monitoring system 200, as described above. The data storage device(s) 230 may include a random access memory (RAM) or another type of dynamic storage device that is capable of storing collected information, and separately storing instructions for execution of system operations by, for example, processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary remote monitoring system 200, or may be provided external to, and in wired or wireless communication with, the exemplary remote monitoring system 200.

The exemplary remote monitoring system 200 may include at least one data output/display device 240 which may be configured as one or more conventional mechanisms that output information to a user, including a display screen on a computing device. The data output/display device 240 may separately be an output port for connection to, for example, a printer, a copier, a scanner, a multi-function device, or a remote storage medium, such as a digital memory in any form. Any suitable data connection in wired or wireless communication with an external data repository or external data storage device is contemplated to be encompassed by the at least one data output/display device 240.

The exemplary remote monitoring system 200 may include one or more separate external data communication interfaces 250 by which the exemplary remote monitoring system 200 may communicate with components external to the exemplary remote monitoring system 200, such as the cloud administration system 130 shown in FIG. 1. Principal external data communication to the cloud administration system for the exemplary remote monitoring system 200 will generally be via at least one external data communication interface 250 configured specifically to facilitate communication with the cloud administration system for sharing information with and updating information stored in one or more CRUM info storage modules of the cloud administration system.

The exemplary remote monitoring system 200 may include a specific customer replaceable unit (CRU) monitoring device 260 as a part of a processor 220 coupled to, for example, one or more storage devices 230, or as a separate component module or circuit in the exemplary remote monitoring system 200. The CRU monitoring device 260 may include at least a CRU identifier unit 262, a CRU compatibility monitor unit 264 and a CRU operations monitor unit 266. Via these separate units, the CRU monitoring device 260 of the exemplary remote monitoring system 200 may execute monitoring and control functions to identify a particular CRU, ensure compatibility of the identified particular CRU with a printing device within which the CRU is installed, and/or detect the status of operations of the CRU.

The CRU identifier unit 262 may provide a list of known CRUM identifiers, for example, to the CRUM info storage module of the cloud administration system to be stored for reference by the cloud administration system. An objective of such storing in the CRUM info storage module is to pair an identifier for each known CRUM with a stored matching identifier. In this manner, information specific to that CRUM, identified by its unique identifier, and moreover to the CRU with which the CRUM is associated, will be stored according to the paired identifier in the CRUM info storage module of the cloud administration system. Regular crosstalk between a specifically-identified CRUM and the cloud administration system will ensure that the information recorded in the CRUM is the same as information recorded according to that CRUM's paired identifier in the CRUM info storage module. When data mismatch is detected, such information may be communicated to the exemplary remote monitoring system 200 for resolution.

The CRU compatibility monitor unit 264 may provide information to the CRUM info storage module in the cloud administration system to identify individual instances of compatibility or non-compatibility between a particular CRU with which the paired CRUM is associated and one or more printing devices within which that particular CRU may be installed. Such a stored compatibility matrix may be updated by the CRU compatibility monitor unit 264 when changes occur, or when discrepancies arise that require specific resolution. An example may be where a particular CRU is installed in a printing device and the information according to the paired identifier in the CRUM info storage module indicates that the particular CRU is not compatible with the printing device. The CRU compatibility monitor unit 264 may update the compatibility information in instances where it is determined that, although not previously listed, the particular CRU may be compatible with the printing device within which the CRU is installed. Information contained in the CRUM info storage module, therefore, may be available to authorize operation of the printing device with a previously-unrecognized CRU once the exemplary remote monitoring system 200 is made aware of, and potentially resolves, the compatibility issue.

The CRU operations monitor unit 266 may provide information to the CRUM info storage module in the cloud administration system to identify, for example, operating restrictions with regard to a particular CRU with which the paired CRUM is associated and/or the one or more printing devices within which that particular CRU may be installed. Such a stored restrictions matrix may be available to ensure authorized operations, operations within appropriate operating parameters, and/or contract compliance. As limits on operations of a particular CRU or printing device are encountered, the CRU operations monitor unit 264 may review the operating parameters of the particular CRU and update information in the CRUM info storage module of the cloud administration system as appropriate to authorize or de-authorize certain operations based on the paired information between that stored in the CRUM info storage module and the CRUM associated with the particular CRU. As contractual requirements and operating limitations change, the CRU operations monitor unit 266 may appropriately update information associated with a particular group of unique CRUM identifiers stored in the CRUM info storage module of the cloud administration system.

All of the various components of the exemplary remote monitoring system 200, as depicted in FIG. 2, may be connected by one or more data/control busses 270. These data/control busses 270 may provide wired or wireless communication between the various components of the exemplary remote monitoring system 200, whether all of those components are housed integrally in, or are otherwise external and connected to, the exemplary remote monitoring system 200.

It should be appreciated that, although depicted in FIG. 2 as an integral unit, the various disclosed elements of the exemplary remote monitoring system 200 may be arranged in any combination of sub-systems as individual components or combinations of components, integral to a single unit, or external to, and in wired or wireless communication with the single unit of the exemplary remote monitoring system 200. In other words, no specific configuration as an integral unit or as a support unit is to be implied by the depiction in FIG. 2. Further, although depicted as individual units for ease of understanding of the details provided in this disclosure regarding the exemplary remote monitoring system 200, it should be understood that the described functions of any of the individually-depicted components may be undertaken, for example, by one or more processors 220 connected to, and in communication with, one or more data storage devices 230.

Figure 3:
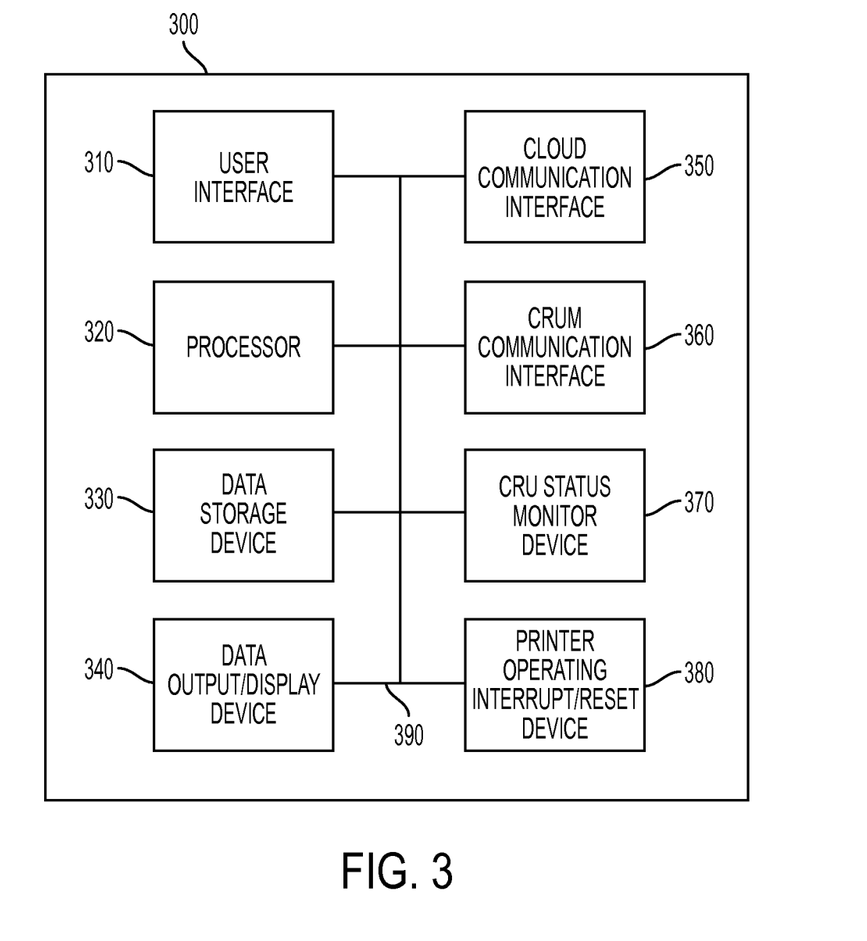
FIG. 3 illustrates a block diagram of an exemplary system to be associated with at least one image forming device for employing cloud administration services to interact with a customer replaceable unit monitor ("CRUM") for monitoring a customer replaceable unit ("CRU") in the at least one image forming device according to this disclosure.

FIG. 3 illustrates a block diagram of an exemplary system 300 to be associated with at least one image forming device for employing cloud administration services to interact with a CRUM for monitoring a CRU in the at least one image forming device according to this disclosure. The exemplary system 300 shown in FIG. 3 may be embodied in a particular image forming device as an integral system, or may otherwise be attached to and in wired or wireless communication with the particular image forming device. It is the exemplary system 300 that is anticipated to coordinate data exchange directly with the cloud administration system for CRUM data exchange and therefore to monitor and control compatibility with an operation of a particular CRU and the image forming device with which the CRU is associated.

The exemplary system 300 may include a user interface 310 by which the user may communicate with the exemplary system 300. The user interface 310 may be a stand-alone user interface, or may be, for example, a portion, or a function, of the graphical user interface (GUI) of the printing device with which the exemplary system 300 is associated. The user interface 310 may be configured according to any one or more of the conventional mechanisms described above with reference to operating interface 210 shown in FIG. 2.

The exemplary system 300 may include one or more local processors 320 for individually operating the exemplary system 300 and carrying out the interaction with the CRUM as a processing link between a cloud communication interface 350 and a CRUM communication interface 360 in the exemplary system 300. Again here, processor(s) 320 may include at least one conventional processor or microprocessor that interprets and executes instructions for communication and interaction with the CRU via the CRUM, and particularly to process data read from and written to the CRUM in order to potentially identify conflicts between data associated with the unique CRUM identifier and data stored in the CRUM info storage module of the cloud administration system associated with a paired unique identifier.

The exemplary system 300 may include one or more data storage devices 330. Such data storage device(s) 330 may be used to store data or operating programs to be used by the exemplary system 300, and specifically the processor(s) 320. At least one data storage device 330 will act as a queue for temporary storage of CRUM data received from the cloud administration system for comparing with the information recorded on the physical CRUM. Data storage device(s) 330 may be the same types of storage devices outlined above with regard to the exemplary remote monitoring system 200 depicted in FIG. 2.

The exemplary system 300 may include a data output/display device 340. In this instance, the data output/display device 340 may be a combined device with the user interface 310, and/or the functions of a local data output/display device 340 may be a portion of, or a function of, the GUI on the image forming device with which the exemplary system 300 is associated.

The exemplary system 300 may include one or more external data communication interfaces. Here, however, the individual external data communication interfaces of the exemplary system 300 will be directed at communicating with the cloud administration system via a cloud communication interface 350, and communicating with one or more CRUMs associated with separate CRUs in the printing device via a CRUM communication interface 360. As indicated above, processor(s) 320 in the exemplary system 300 may act as a communication path between the cloud communication interface 350 and the CRUM communication interface 360 with an objective of ensuring that information associated with the unique CRUM identifier is maintained to be identical between the CRUM and the CRUM info storage module in the cloud administration system. The cloud communication interface 350 and the CRUM communication interface 360 may be configured to include any mechanism that facilitates communication via a networked environment with the cloud administration system and any mechanism that facilitates communication directly with the CRUM, respectively.

The exemplary system 300 may include a CRU status monitor device 370 by which dynamically changing information regarding a status of the CRU may be updated in the CRUM, and, according to the mechanisms outlined above may be separately updated in the CRUM info storage module of the cloud administration system. An example of a particular use for the CRU status monitor device 370 may be to provide an indication or a prediction of exhaustion of a consumable, or an end-of-life condition of the CRU, or otherwise an indication that the CRU has been rendered defective in some manner, in order that information in the CRUM may be verified with the like information in the CRUM info storage module of the cloud administration system to (1) order a replacement consumable or CRU, and (2) verify return information for the expended CRU to a supplier or manufacturer, including specific provision for generating shipping information and printing a shipping label to be attached to the expended or defective CRU in order to facilitate returning the expended or defective CRU to a specific location as designated, or directed, by the supplier or manufacturer. Each associated return label could have a unique tracking number associated with it. The supplier or manufacturer then could extend its tracking of the expended or defective CRU by way of a logistical tracking scheme based on the unique tracking number until the supplier or manufacturer confirms receipt of the returned expended or defective CRU. In doing so, a supplier or manufacturer may better be able to manage costs associated with CRUs and the logistic scheme that supports management of CRUs in transit. A supplier or manufacturer could, for example, charge a user a fee for non-return of a CRU or otherwise could credit the user for the return of the CRU. The unique tracking number may be assigned to the CRU and/or stored in the CRUM by the supplier or manufacturer before the CRU is initially sent to a customer, or otherwise placed in a stream of commerce outside the immediate control of the supplier or manufacturer. In this manner, the CRU could be "tracked" from the time it leaves the supplier or manufacturer until it is returned to the supplier or manufacturer.

The exemplary system 300 may include a printer operating interrupt/reset device 380. The printer operating interrupt/reset device 380 may be used in communication with the other components of the exemplary system 300 to (1) interrupt operation of the printing device when a discrepancy is detected between data in the CRUM and information stored in the CRUM info storage device of the cloud administration system, and/or (2) reset/restart operation of the printing device when a detected discrepancy between data in the CRUM and the information stored in the CRUM info storage device of the cloud administration system is resolved.

As with the exemplary remote monitoring system 200 shown in FIG. 2, all of the various components of the exemplary system 300, as depicted in FIG. 3, may be connected by one or more data/control busses 390. These data/control busses 390 may provide wired or wireless communication between the various components of the exemplary system 300, as all of those components are intended to be housed integrally in a single device.

It should be appreciated that, although depicted in FIG. 3 as an integral unit, the various disclosed elements of the exemplary system 300 may be arranged in any combination of sub-systems as individual components or combinations of components, integral to a single unit, or as components of the image forming device with which the exemplary system 300 is associated. No specific configuration is to be implied by the depiction in FIG. 3.

Figure 4A:
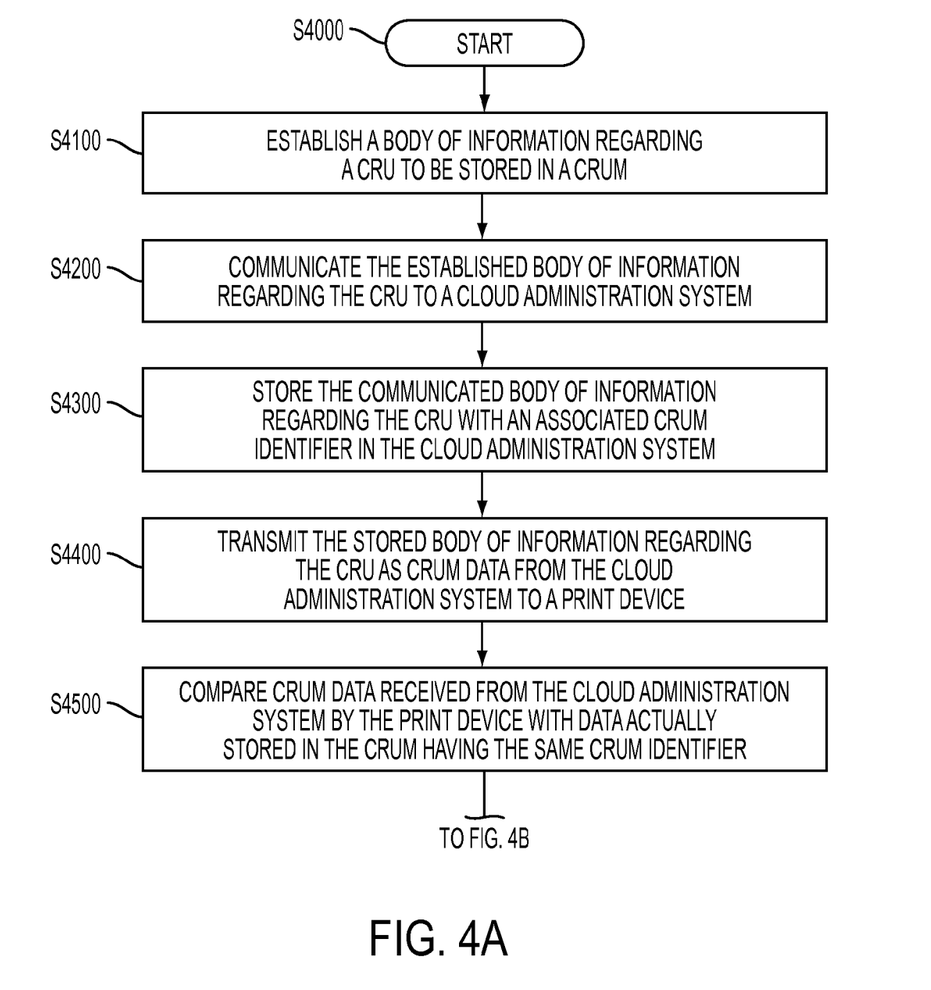
FIGS. 4A and 4B illustrate a flowchart of an exemplary method for employing cloud administration services to interact with a CRUM for monitoring a CRU in an image forming device according to this disclosure.
Figure 4B:
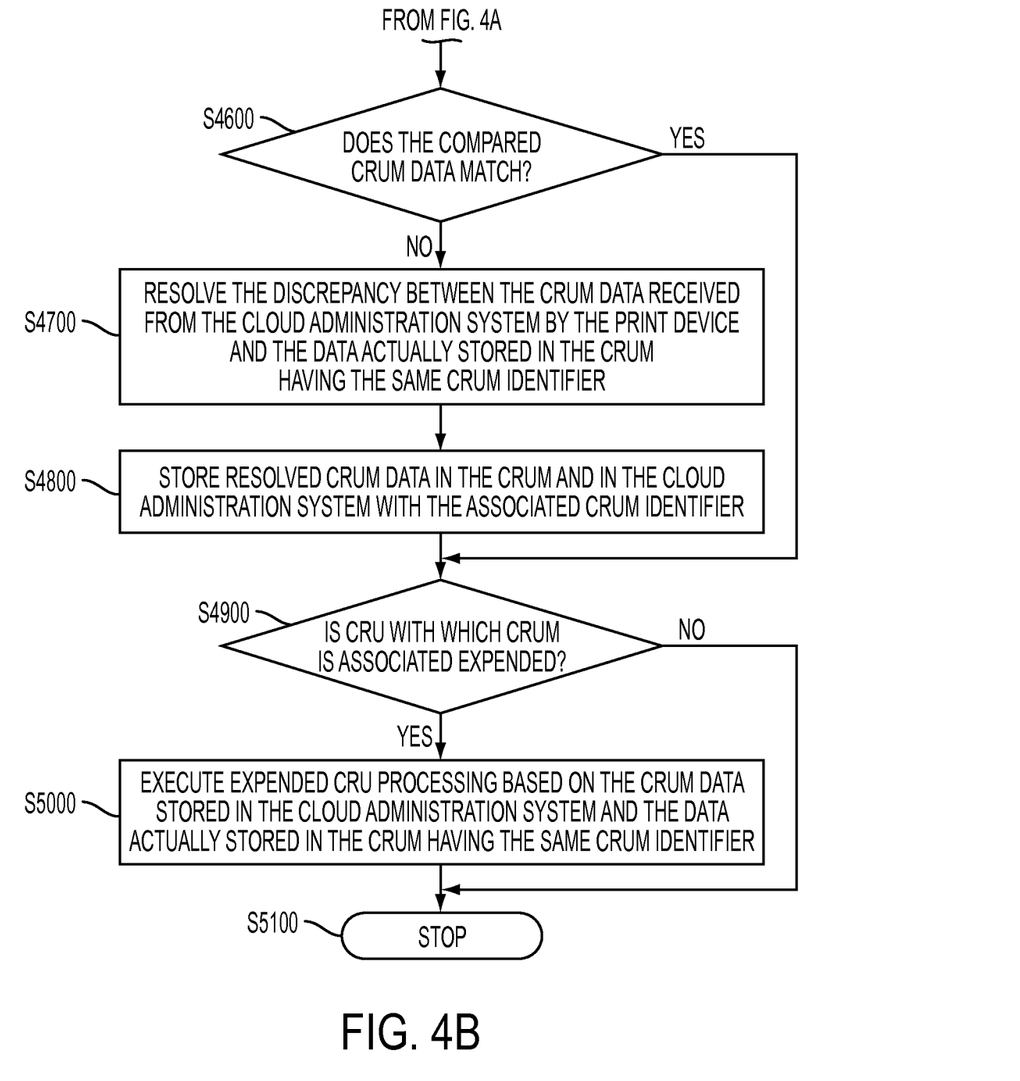

The disclosed embodiments may include a method for employing cloud administration services and systems to interact with electronically-readable component monitoring modules associated with customer replaceable components in customer owned and/or controlled devices, such as, for example, image forming devices. FIGS. 4A and 4B illustrate a flowchart of an exemplary method for employing cloud administration services to interact with a CRUM for monitoring a CRU in an image forming device according to this disclosure. As shown in FIG. 4A, operation of the method commences at Step S4000 and proceeds to Step S4100.

In Step S4100, a body of information regarding a CRU may be established to be stored in the CRUM. This body of information may include, for example, the unique identifier for the CRUM, identification information of the CRU such as model and/or serial number, contractual limitations associated with operation of the CRU, compatibility of the CRU with one or more models of an image forming device such as a printing device, and return instructions for the CRU once it is expended. It should be noted that this list is intended to provide an exemplary indication of the types of information that may constitute the established body of information, but the list is not inclusive. The body of information may be collected from numerous sources available to, for example, a supplier or manufacturer of the CRU, a shipping company, or the image forming device itself. Operation of the method proceeds to Step S4200.

In Step S4200, the body of information, once established, may be communicated to a cloud administration system. This communication may be by known wired or wireless means, or a combination of such means, with processing and/or transmission modules in an originating system for the body of information and the cloud administration system cooperatively interacting with one another. Operation of the method proceeds to Step S4300.

In Step S4300, the communicated body of information regarding the CRU may be stored in the cloud administration system. Such storage may include storing the body of information in a storage module specifically designated to receive such bodies of information specifically associated with a paired unique identifier related to the CRUM identifier for specifically matching the information to a particular CRUM. Operation of the method proceeds to Step S4400.

In Step S4400, the stored body of information regarding the CRU maybe separately transmitted to a printing device in which the CRU having the CRUM with the unique identifier is installed. The body of information may be temporarily stored in a data storage device in the printing device. Operation of the method proceeds to Step S4500.

In Step S4500, a comparison may be made between the CRUM data temporarily stored in a data storage device in the printing device with the data actually stored on the CRUM having the same unique identifier. Operation of the method proceeds to Step S4600.

Step S4600 is a determination step. In Step S4600, a determination is made whether the compared CRUM data, i.e., the CRUM data temporarily stored in the data storage device in the printing device and the data actually stored on the CRUM, matches.

If, in Step S4600, it is determined that the compared CRUM data matches, operation of the method proceeds to Step S4900.

If, in Step S4600, it is determined that the compared CRUM data does not match, operation of the method proceeds to Step S4700.

In Step S4700, processing may be undertaken to resolve the discrepancy between the compared CRUM data. Such processing may include simply updating the CRUM data temporarily stored in the storage device in the printing device with use information measured by the printing device and currently stored in the physical CRUM. Such processing may alternatively include resolving compatibility issues between the CRU and the printing device by manipulating stored CRUM data. Other processing may be undertaken depending on the nature of the discrepancy. Operation the method proceeds to Step S4800.

In Step S4800, resolved CRUM data, based on an appropriate resolution of the discrepancy between the compared CRUM data, may be communicated to and stored in the physical CRUM, and/or otherwise communicated to and stored in the CRUM information storage module in the cloud administration system, as appropriate. Operation of the method proceeds to Step S4900.

Step S4900 is a determination step. In Step S4900, a determination is made regarding whether the CRU with which the CRUM having the unique identifier is associated has been expended, or otherwise has reached an end of its useful life. This determination may be made according to some measurable characteristic, with results of a particular measurement being overwritten on the physical CRUM associated with the CRU, or may be directed according to, for example, some contractual agreement information about which is stored on the physical CRUM and may be updated via the cloud administration system.

If, in Step S4900, it is determined that the CRU is not expended, operation of the method reverts to Step S5100, where operation of the method ceases.

If, in Step S4900, it is determined that the data collection operation is complete, operation of the method proceeds to Step S5000

In Step S5000, expended CRU processing may be executed. Such expended CRU processing may include automated ordering of the replacement CRU, uploading a new body of information according to the new unique CRUM identifier to the cloud administration system, and directing return of the expended CRU to the supplier or manufacturer at a location of the supplier's or manufacturer's choosing according to data stored in the storage module of the cloud administration system in association with the unique identifier for the CRUM of the expended CRU. The processing may include, for example, directing printing of a return address label by the printing device within which the expended CRU is installed, and associating a tracking number or URL and return receipt status with each unique CRU as cloud data. Operation the method proceeds to Step S5100, where operation the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by a processor. Generally, program modules include routine programs, objects, components, data structures, and the like that perform particular tasks or implement particular data types in support of the overall objective of the systems and methods according to this disclosure. As indicated in detail above, portions of the disclosed systems and methods will be located in or otherwise executed by a cloud administration system.

Those skilled in the art will appreciate that other embodiments of the disclosed subject matter may be practiced in data network environments with many types of communication equipment and computer system configurations. Embodiments according to this disclosure may be practiced in distributed computing environments where tasks are performed by local and remote actual and virtualized processing devices that may be linked to each other by hardwired links, wireless links, or a combination of both through a communication network. In a distributed computing environment, program modules may be located in both local and remote memory storage devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 4, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to each individual printing device of a plurality of printing devices where each printing device may include some portion of the disclosed system and execute some portion of the disclosed method.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A method of managing an image forming device, the method comprising:
   receiving, by a processor in the image forming device, information stored in a cloud administration system regarding a customer replaceable component that is associated with a unique identifier for an electronically-readable monitoring module in the customer replaceable component;
   comparing the received information with information stored in the electronically-readable monitoring module having the unique identifier using the processor in the image forming device;
   outputting a result of the comparing to a user; and
   when it is determined from the comparing that a difference exists between the received information and the stored information, executing further processing to resolve the difference,
   the cloud administration system operating as a shared resource for each of a plurality of image forming devices.

2. The method of claim 1, the executing of the further processing resulting in resolved information, the resolved information being stored in the electronically-readable monitoring module and being transmitted to the cloud administration system to be stored in association with the unique identifier.

3. The method of claim 1, the comparing of the received information with the information stored in the electronically-readable monitoring module indicating that the customer replaceable component is at least one of exhausted, at an end of a service life or rendered defective, and the executing of the further processing comprising:
   obtaining a destination address to which the customer replaceable component is to be sent, and
   printing a mailing label with the image forming device including the obtained destination address to be attached to the customer replaceable component for shipping.

4. The method of claim 1, the information stored in the cloud administration system regarding the customer replaceable component being at least one of received from and updated by a remote processing center.

5. The method of claim 4, the remote processing center being associated with one of a supplier or manufacturer of the customer replaceable component.

6. The method of claim 1, the information stored in the cloud administration system regarding the customer replaceable component including a list of image forming devices with which the customer replaceable component is compatible.

7. The method of claim 6, the difference between the received information and the stored information indicating that the customer replaceable component is not compatible with the image forming device.

8. The method of claim 7, the executing of the further processing comprising disabling the image forming device when it is determined that the customer replaceable component is not compatible with the image forming device.

9. The method of claim 7, further comprising:
determining that the customer replaceable component should be made compatible with the image forming device, and
updating the stored information in the cloud administration system to include the image forming device on the list of image forming devices with which the customer replaceable component is compatible.

10. The method of claim 1, the information stored in the cloud administration system regarding the customer replaceable component including authorized operations for the customer replaceable component.

11. The method of claim 10, the executing of the further processing comprising disabling the image forming device when it is determined that the customer replaceable component is not being operated according to the authorized operations stored in the cloud administration system.

12. A system for managing an image forming device, comprising:
a first communication interface in the image forming device for communicating with an electronically-readable monitoring module in a customer replaceable component in the image forming device, the electronically-readable monitoring module being identifiable by a unique identifier and storing information regarding a plurality of characteristics of the customer replaceable component;
a second communication interface in the image forming device for communicating with a cloud administration system to obtain information stored in the cloud administration system that is associated with the unique identifier for the electronically-readable monitoring module;
a data storage device in the image forming device for temporarily storing the information stored in the cloud administration system associated with the unique identifier for the electronically-readable monitoring module received in the image forming device via the second communication interface; and
a processor that is programmed to:
identify the unique identifier of the electronically-readable monitoring module;
request that the information stored in the cloud administration system that is associated with the unique identifier be transmitted to the image forming device;
receive the information stored in the cloud administration system that is associated with the unique identifier via the second communication interface;
compare the received information with the information stored in the electronically-readable monitoring module having the unique identifier;
output a result of the comparing to a user; and
when it is determined from the comparing that a difference exists between the received information and the stored information, execute further processing to resolve the difference,
the cloud administration system operating as a shared resource for each of a plurality of image forming devices.

13. The system of claim 12, the processor being further programmed to resolve differences in the received information and the stored information in communication with at least one of a local or a remote resource and to direct storing of resolved information in the electronically-readable monitoring module via the first communication interface and in the cloud administration system via the second communication interface.

14. The system of claim 12, the processor being further programmed to:
determine that the customer replaceable component is at least one of exhausted or at an end of a service life based on the information stored in the electronically-readable monitoring module,
obtain a destination address to which the customer replaceable component is to be sent from the information stored in the cloud administration system, and
direct the image forming device to print a mailing label including the obtained destination address to be attached to the customer replaceable component for shipping.

15. The system of claim 12, the processor being further programmed to:
determine, based on the received information from the cloud administration system, whether the customer replaceable component is compatible with the image forming device, and
disable the image forming device when the customer replaceable component is determined not to be compatible with the image forming device.

16. The system of claim 15, the processor being further programmed to indicate that the customer replaceable component is compatible with the image forming device.

17. The system of claim 12, the processor being further programmed to:
determine, based on the received information from the cloud administration system, whether the customer replaceable component is being operated in an authorized manner in the image forming device, and
disable the image forming device when it is determined that the customer replaceable component is not being operated in an authorized manner in the image forming device.

18. The system of claim 12, the image forming device being at least one of a printing device or a copying device.

19. The system of claim 12, the image forming device being a xerographic image forming device.

20. A non-transitory computer-readable medium storing instructions which, when executed by a processor, cause the processor to execute the steps of a method comprising:
receiving, in an image forming device, information stored in a cloud administration system regarding a customer replaceable component that is associated with a unique identifier for an electronically-readable monitoring module in the customer replaceable component;
comparing the received information with information stored in the electronically-readable monitoring module having the unique identifier;
outputting a result of the comparing to a user; and
when it is determined from the comparing that a difference exists between the information received in the image forming device from the cloud administration system and the stored information in the electronically-readable monitoring module, executing further processing to resolve the difference.

* * * * *